(12) United States Patent
Huang et al.

(10) Patent No.: US 11,689,550 B2
(45) Date of Patent: Jun. 27, 2023

(54) METHODS AND APPARATUS TO ANALYZE NETWORK TRAFFIC FOR MALICIOUS ACTIVITY

(71) Applicant: McAfee, LLC, Santa Clara, CA (US)

(72) Inventors: Yonghong Huang, Hillsboro, OR (US); Armando Rodriguez, Parker, CO (US); Adam Wosotowsky, Lilburn, GA (US); John Wagener, West Lakelend, MN (US); Joanna Negrete, Brentwood, CA (US); Eric Peterson, Elizabeth, CO (US); Celeste Fralick, Lubbock, TX (US)

(73) Assignee: MCAFEE, LLC, San Jose, CA (US)

( * ) Notice: Subject to any disclaimer, the term of this patent is extended or adjusted under 35 U.S.C. 154(b) by 568 days.

(21) Appl. No.: 16/818,669

(22) Filed: Mar. 13, 2020

(65) Prior Publication Data

US 2021/0288976 A1    Sep. 16, 2021

(51) Int. Cl.
*G06F 17/16* (2006.01)
*G06N 3/08* (2023.01)
(Continued)

(52) U.S. Cl.
CPC .......... *H04L 63/1425* (2013.01); *G06F 17/16* (2013.01); *G06F 18/214* (2023.01);
(Continued)

(58) Field of Classification Search
CPC ............... H04L 63/1408; H04L 63/145; H04L 63/1425; G06F 17/16; G06F 21/554;
(Continued)

(56) References Cited

U.S. PATENT DOCUMENTS 10,230,746 B2 *   3/2019   Visbal ...................... H04L 63/14
11,019,076 B1 *   5/2021   Jakobsson ............. H04L 51/212
(Continued)

OTHER PUBLICATIONS

Kipf et al., "Semi-Supervised Classification WITH Graph Convolutional Networks," Published as a conference paper at ICLR 2017, available online at {arXiv:1609.02907v4 [cs.LG]}, Feb. 22, 2017, (14 pages).

(Continued)

*Primary Examiner* — Asghar H Bilgrami
(74) *Attorney, Agent, or Firm* — Hanley, Flight & Zimmerman, LLC

(57) ABSTRACT

Methods, apparatus, systems and articles of manufacture are disclosed to analyze network traffic for malicious activity. An example apparatus includes a graph generator to, in response to obtaining one or more internet protocol addresses included within input data, generate a graph data structure based on one or more features of the one or more internet protocol addresses in the input data, a file generator to generate a first matrix using the graph data structure, the first matrix to represent nodes in the graph data structure and generate a second matrix using the graph data structure, the second matrix to represent edges in the graph data structure, and a classifier to, using the first matrix and the second matrix, classify at least one of the one or more internet protocol addresses to identify a reputation of the at least one of the one or more internet protocol addresses.

23 Claims, 8 Drawing Sheets

(51) Int. Cl.
*H04L 9/40* (2022.01)
*G06F 21/55* (2013.01)
*G06F 18/214* (2023.01)

(52) U.S. Cl.
CPC ............. *G06N 3/08* (2013.01); *H04L 63/145* (2013.01); *H04L 63/1408* (2013.01)

(58) Field of Classification Search
CPC ...... G06K 9/6256; G06K 9/6274; G06N 3/08; G06N 3/0454; G06N 5/022
See application file for complete search history.

(56) References Cited

U.S. PATENT DOCUMENTS

| | | | | |
|---|---|---|---|---|
| 11,102,244 | B1* | 8/2021 | Jakobsson | H04L 51/42 |
| 11,223,489 | B1* | 1/2022 | Miller | H04L 9/0819 |
| 11,363,059 | B2* | 6/2022 | Sodja | H04L 63/1433 |
| 2015/0319185 | A1* | 11/2015 | Kirti | H04L 63/1416 726/23 |
| 2016/0021141 | A1* | 1/2016 | Liu | H04L 63/1425 726/23 |
| 2016/0212172 | A1* | 7/2016 | Senanayake | H04L 63/20 |
| 2017/0251013 | A1* | 8/2017 | Kirti | H04L 63/1441 |
| 2018/0375886 | A1* | 12/2018 | Kirti | H04L 67/10 |
| 2019/0068627 | A1* | 2/2019 | Thampy | H04W 12/12 |
| 2019/0312846 | A1* | 10/2019 | Taylor | H04L 63/1408 |
| 2019/0333099 | A1* | 10/2019 | Sohum | H04L 63/101 |
| 2020/0112571 | A1* | 4/2020 | Koral | G06N 3/08 |
| 2020/0128047 | A1* | 4/2020 | Biswas | H04L 67/10 |
| 2020/0389459 | A1* | 12/2020 | Girardi | G06F 7/08 |
| 2021/0090816 | A1* | 3/2021 | Ibrahim | H04L 63/1425 |
| 2021/0200859 | A1* | 7/2021 | Yavo | G06F 21/56 |
| 2021/0234889 | A1* | 7/2021 | Burle | H04L 63/20 |
| 2022/0014543 | A1* | 1/2022 | Jakobsson | H04L 63/1425 |

OTHER PUBLICATIONS

Levine, J., "DNS Blacklists and Whitelists: draft-irtf-asrg-dnsbl-08," Anti-Spam Research Group, Nov. 17, 2008, (13 pages).

admins@dnswl.org, "Whitelisting DKIM-signed domains," dnswl.org, Oct. 7, 2017, (4 Pages).

Springer, "Layer-Wise Relevance Propagation: An Overview," available online at [https://https://link.springer.com/chapter/10.1007/978-3-030-28954-6_10], Sep. 10, 2019, last retrieved on Feb. 17, 2020, (16 pages).

Esquivel et al., "On the Effectiveness of IP Reputation for Spam Filtering," 2010 Second International Conference an COMmunication Systems and NETworks (COMSNETS 2010), Jan. 5-9, 2010, (10 Pages).

Chiba et al., "Detecting Malicious Websites by Learning IP Address Features," 2012 IEEE/IPSJ 12th International Symposium on Applications and the Internet, Jul. 16-20, 2012, (12 Pages).

Bajaj et al., "Critical analysis of spam prevention techniques," 2011 3rd International Workshop on Security and Communication Networks (IWSCN), May 2011, (6 Pages).

Pagani et al., "Measuring the Role of Greylisting and Nolisting in Fighting Spam,"Università degli Studi di Milano, International Conference on Dependable Systems and Networks, 2016, (43 Pages).

Antonakakis et al., "Building a Dynamic Reputation System for DNS," USENIX Security '10: Proceedings of the 19th USENIX conference on Security, Aug. 11, 2010, (17 Pages).

* cited by examiner

METHODS AND APPARATUS TO ANALYZE NETWORK TRAFFIC FOR MALICIOUS ACTIVITY

FIELD OF THE DISCLOSURE

This disclosure relates generally to network intrusion detection, and, more particularly, to methods and apparatus to analyze network traffic for malicious activity.

BACKGROUND

Malware (e.g., viruses, worms, trojans, ransomware) is malicious software that is disseminated by attackers to launch a wide range of security attacks, such as stealing user's private information, hijacking devices remotely to deliver massive spam emails, infiltrating a user's online account credentials, etc. The introduction of malware to a computing system may cause serious damages and significant financial loss to computer and/or Internet users.

Figure 1:
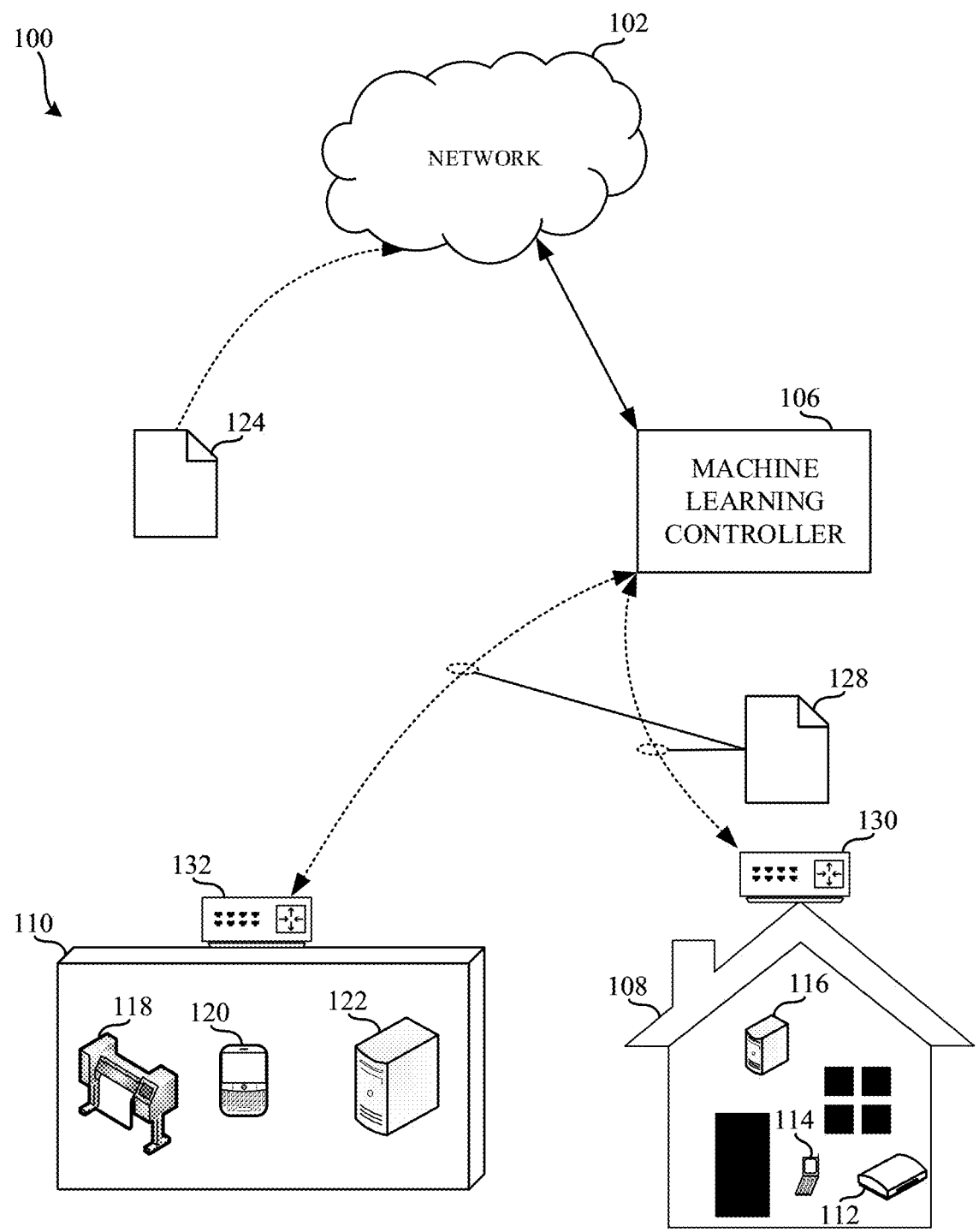
FIG. 1 is a block diagram of an example environment configured to verify the reputation of an internet protocol (IP) address.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Currently, many people (e.g., millions of users) have access to the Internet. When accessing and/or otherwise connecting to the Internet, a user typically utilizes an Internet-enabled device. Such an Internet-enabled device is associated with an IP address (e.g., a network address) provided by an Internet Service Provider (ISP). ISPs typically provide a single public (IP) address for each location (e.g., a media presentation location, a household, an internet café, an office, etc.) receiving Internet services.

Typically, a request may be initiated by varying individuals and/or entities to identify and/or determine the reputation of a user accessing the Internet based on the associated IP address. Such requests to verify the reputation of a user based on an IP address can be utilized to mitigate potential attacks that may be carried out via disreputable (e.g., compromised, untrustworthy, non-reputable, etc.) websites and IP addresses. As used herein, a reputation of an IP address may refer to either a reputable IP address or a disreputable IP address. As used herein, a reputable IP address corresponds to an IP address that is more likely than not associated with non-malicious activity. For example, an IP address of a device associated with a non-malicious user (e.g., a user that normally browses the Internet) may be considered reputable. As used herein, a disreputable IP address corresponds to an IP address that is more likely than not associated with malicious activity. For example, an IP address of a device associated with a malicious user (e.g., a user that is attempting to breach a network firewall) may be considered disreputable. IP addresses are scalable and often dynamic in nature, and, thus it becomes a challenging and computationally intensive task to identify an accurate reputation of an IP address.

Traditional security approaches attempt to protect users from malicious IP addresses by employing blacklisting techniques. Alternatively, entities such as security vendors, ISPs, and law enforcement groups have developed statistical analysis methods that are dedicated to exposing and blocking malicious IPs online. However, such approaches are inefficient when operating at scale and, even more so, cannot properly scale up with the large number of Internet uses and/or reputation verification requests.

Examples disclosed herein include utilizing a graph-based semi-supervised learning model with a graph neural network (GNN) such as, for example, a graph convolutional neural network (GCNN) to determine the reputation of IP address at scale. Examples disclosed herein include generating a graph database and/or any suitable graph data structure based on feature extraction of IP address data. As such, the graph database and/or suitable graph data structure may be used to infer IP reputation in a semi-supervised way. For example, the graph database and/or suitable graph data structure can enable examples disclosed herein to propagate the reputation determination from known reputable or known disreputable nodes to unknown nodes (e.g., unknown IP addresses).

In examples disclosed herein, a graph database and/or suitable graph data structure is generated responsive to obtaining an IP address. Accordingly, the graph database and/or suitable graph data structure may include edges and nodes corresponding to each IP address. As used herein, a node refers to a single IP address. Additionally, as used herein, an edge refers to a relationship between one or more nodes. An edge is used to represent varying categories and/or other properties of an IP address (e.g., a node) that can be grouped together with another IP address. For example, if two IP addresses originate from the same geographic location (e.g., country, etc.), an edge between such two IP addresses may be a geolocation grouping of the two IP addresses. In another example, in the event multiple IP addresses are in the same networking architecture (e.g., within a Class C subnetwork), example edges between corresponding IP addresses may designate such a shared networking architecture. In yet another example, an edge between one or more IP addresses may indicate common Autonomous System Numbers (ASNs).

By generating a graph database of IP addresses in which the edges illustrate relationships between nodes, examples disclosed herein include inferring information related to groups of IP addresses such as, for example, how each group of IP addresses is utilized. For example, if a group of IP addresses is owned by an ISP, and therefore the group of IP addresses have the same ASN that reflects the ISP, then the group of IP addresses may reflect typical behavior of the ISP. If an ISP assigns a group of IP addresses to private residential users, the nodes and edges sharing the same ASN (e.g., an ASN that reflects the group of private residential users) may reflect typical behavior of private residential users. Likewise, if the ISP assigns a group of IP addresses to small businesses, the nodes and edges sharing the same ASN (e.g., an ASN that reflects the group of small businesses) may reflect typical behavior of small businesses.

Examples disclosed herein train a GNN or GCNN using only a small subset of labeled training data (e.g., ten percent of the total input data, five percent of total input data, etc.). Examples disclosed herein enable a system configured to identify the reputation of an IP address to do so with a high accuracy percentage (e.g., 85%) and a low percentage of labeled data (e.g., 5%). In other examples disclosed herein, any suitable percentage accuracy measurement based on any suitable percentage of labeled data may be achieved.

Examples disclosed herein employ a transductive GNN model and/or a transductive GCNN model. As used herein, a transductive GNN model, a transductive GCNN model, or a transductive machine learning environment is trained during an inference operation. Further in such an example using a transductive GNN model, a transductive GCNN model, or a transductive machine learning environment, an example machine learning controller obtains both (1) a set of labeled training data, and (2) a set of unlabeled data when executing the GNN or GCNN model.

As used herein, a transductive machine learning environment refers to a computing environment operable to perform training and inference operations at substantially the same time (e.g., within a same execution schedule) on a single computing device. For example, a machine learning controller in a transductive machine learning environment obtains (1) known input training data and (2) unknown input data from external sources. While a transductive machine learning environment typically uses a single computing device, any suitable number of computing devices may be used (e.g., parallel processors on two personal computers, three virtual machines executing instruction in parallel or in series, etc.).

FIG. 1 is a block diagram of an example environment 100 configured to verify the reputation of an IP address. In FIG. 1, the environment 100 includes an example network 102, an example machine learning controller 106, and an example first connectivity environment 108 and an example second connectivity environment 110. The example first connectivity environment 108 includes a first example network device 112, a second example network device 114, and a third example network device 116. The example second connectivity environment 110 includes a first example network device 118, a second example network device 120, and a third example network device 122.

In the example illustrated in FIG. 1, the network 102 is a wireless communications network. In other examples disclosed herein, the network 102 may be implemented using wired communications (e.g., a local area network (LAN)) and/or any suitable combination of wired and/or wireless communication networks.

In examples disclosed herein, the environment 100 is a transductive machine learning environment and, thus, the input training data 124 is transmitted directly to the machine learning controller 106 through the network 102 for subsequent processing. In examples disclosed herein, the input training data 124 includes one or more sets of labeled IP addresses. For example, the input training data 124 may include four IP addresses labeled as known to be reputable (e.g., non-malicious) and two IP addresses labeled as known to be disreputable (e.g., malicious). Accordingly, in such an example, the machine learning controller 106 constructs a graph database including six total nodes (e.g., four nodes for the four reputable IP addresses and two nodes for the two disreputable IP addresses). In example operations disclosed herein, the machine learning controller 106 may update the graph database and/or graph data structure periodically and/or periodically in the event additional input training data is obtained and/or available.

The example machine learning controller 106 of FIG. 1 is a computing device that obtains the example input training data 124 and/or the example input data 128 from either the first connectivity environment 108 or the second connectivity environment 110. For example, a verification request may originate from the first connectivity environment 108 and, thus, the first connectivity environment 108 transmits example input data 128 including IP addresses to be verified to the machine learning controller 106. Alternatively, an external entity (e.g., a malware protection service) may initiate a request to verify IP addresses associated with the first connectivity environment 108. In such an example, the machine learning controller 106 communicates with the first connectivity environment 108 to obtain the IP addresses included in the input data 128. In other examples disclosed herein, the machine learning controller 106 obtains input data 128 from any number of connectivity environments.

In operation, the machine learning controller 106 extracts feature data associated with each IP address in the input training data 124 and/or the input data 128. For example, the machine learning controller 106 is configured to identify characteristics of IP addresses such as, for example, the particular subnetwork of a Class C network, the ASN, the geolocation, etc., associated with the IP address. In this manner, the identified characteristics (e.g., the extracted feature data) are organized as edges in the graph database and/or other graph data structure. For example, if two of the four IP addresses known to be reputable (e.g., non-malicious) originate within the same Class C subnetwork, an edge indicating the Class C subnetwork is generated between the two IP addresses sharing the same Class C subnetwork. In this manner, the machine learning controller 106 generates an example graph database and/or other graph data structure that represents the identified IP addresses and common relationships between each IP address. An illustration of an example graph database and/or graph data structure is described below, in connection with FIG. 4.

In operation, the machine learning controller 106 may update the graph database and/or graph data structure with additional nodes and edges extracted from the input data 128. For example, the machine learning controller 106 likewise extracts feature data from each IP address in the input data 128. In this manner, the machine learning controller 106 updates the graph database and/or graph data structure using the extracted feature data. Using the trained GCNN model, the machine learning controller 106 executes the GCNN model with the updated graph database. The machine learning controller 106 generates an example feature matrix and an adjacency matrix using the nodes and edges, respectively, of the graph database and/or graph data structure. Further, the machine learning controller 106 aggregates the feature matrix and the adjacency matrix as an input to the trained GCNN model. In this manner, the machine learning controller 106 performs layer-wise propagation (e.g., a non-linear transformation) to the aggregated feature matrix and adjacency matrix. The machine learning controller 106 performs node classification on the resultant output and, once completed, identifies the probabilities for each node being reputable or disreputable.

In the event the machine learning controller 106 identifies nodes as disreputable, the machine learning controller 106 initiates anti-malware pre-emptive measures such as, for example, blacklisting the IP address associated with the node classified as disreputable, notifying the owners of the IP address associated with the node classified as disreputable, notifying the owners of neighboring IP addresses, etc.

As described above, the environment 100 is a transductive machine learning environment and, thus, the machine learning controller 106 may not have access to a previously trained GCNN model. In such an example, the machine learning controller 106 either (1) obtains the input training data 124 from the network 102 or (2) obtains the input data 128 from either the first connectivity environment 108 or the second connectivity environment 110. The machine learning controller 106 then may subsequently label a subset of IP addresses within the input data 128 for use in operation. In this example, the machine learning controller 106 extracts feature data associated with each IP address in the input training data 124 and the input data 128. For example, the machine learning controller 106 is configured to identify characteristics of IP addresses such as, for example, the particular subnetwork of a Class C network, the ASN, the geolocation, etc., associated with the IP address. In this manner, the identified characteristics (e.g., the extracted feature data) are organized as edges in the graph database and/or other graph data structure. For example, if two of the four IP addresses known to be reputable (e.g., non-malicious) originate within the same Class C subnetwork, an edge indicating the Class C subnetwork is generated between the two IP addresses sharing the same Class C subnetwork. In this manner, the machine learning controller 106 generates an example graph database and/or other graph data structure that represents the identified IP addresses and common relationships between each IP address. An illustration of an example graph database and/or graph data structure is described below, in connection with FIG. 4.

In an example in which the environment 100 is a transductive machine learning environment, the machine learning controller 106 is configured to train a GNN such as, for example, a GCNN, using the graph database and/or graph data structure. Further, the machine learning controller 106 is configured to reiterate training of the GCNN until a training threshold accuracy is satisfied. Once the threshold accuracy is satisfied, the machine learning controller 106 may store the graph database and/or any results.

In operation, the machine learning controller 106 generates an example feature matrix and an adjacency matrix using the nodes and edges, respectively, of the graph database and/or graph data structure. Further, the machine learning controller 106 aggregates the feature matrix and the adjacency matrix as an input to the GCNN. In this manner, the machine learning controller 106 performs layer-wise propagation (e.g., a non-linear transformation) to the aggregated feature matrix and adjacency matrix. The machine learning controller 106 performs node classification on the resultant output and, once completed, identifies the probabilities for each node being reputable or disreputable.

In the example illustrated in FIG. 1, the first connectivity environment 108 is represented as a residential household. In such an example, the first connectivity environment 108 includes the first network device 112, the second network device 114, and the third network device 116. Any number of network devices may be present in the first connectivity environment 108. The first connectivity environment 108 further includes an example residential router 130. In this manner, the residential router 130 communicates the input data 128 to the machine learning controller 106. In examples disclosed herein, the input data 128 may include a local IP address associated with each of the first network device 112, the second network device 114, the third network device 116, and/or the IP address assigned to the residential router 130 by an ISP.

In the example illustrated in FIG. 1, the second connectivity environment 110 is represented as a commercial building. In such an example, the second connectivity environment 110 includes the fourth network device 118, the fifth network device 120, and the sixth network device 122. Any number of network devices may be present in the second connectivity environment 110. The second connectivity environment 110 further includes an example commercial router 132. In this manner, the commercial router 132 communicates the input data 128 to the machine learning controller 106. In examples disclosed herein, the input data 128 may include an IP address associated with the fourth network device 118, the fifth network device 120, the sixth network device 122, and/or the IP address assigned to the commercial router 132 by an ISP.

In the example illustrated in FIG. 1, the first network device 112 is a gaming console, the second network device 114 is a cellular phone, the third network device 116 is a personal computer, the fourth network device 118 is a plotter, the fifth network device 120 is a personal organizer, and the sixth network device 122 is a personal computer. While, in the illustrated example, an Internet enabled gaming console, cellular phone, personal computer, plotter, and personal organizer are shown, any other type(s) and/or number(s) of network device(s) may additionally or alternatively be used. For example, Internet-enabled mobile handsets (e.g., a smartphone), tablet computers (e.g., an iPad®, a Google Nexus, etc.) digital media players (e.g., a Roku® media player, a Slingbox®, etc.) etc. may additionally or alternatively be implemented. Further, while in the illustrated example six network devices are shown, any number of network devices may be implemented. While in the illustrated example, the network devices 112, 114, 116, 118, 120, 122 are wireless devices (e.g., connected to the Internet via a wireless communications method) any of the network devices 112, 114, 116, 118, 120 may be wired devices (e.g., connected to Internet via a wired connection such as, for example, an Ethernet connection).

Figure 2:
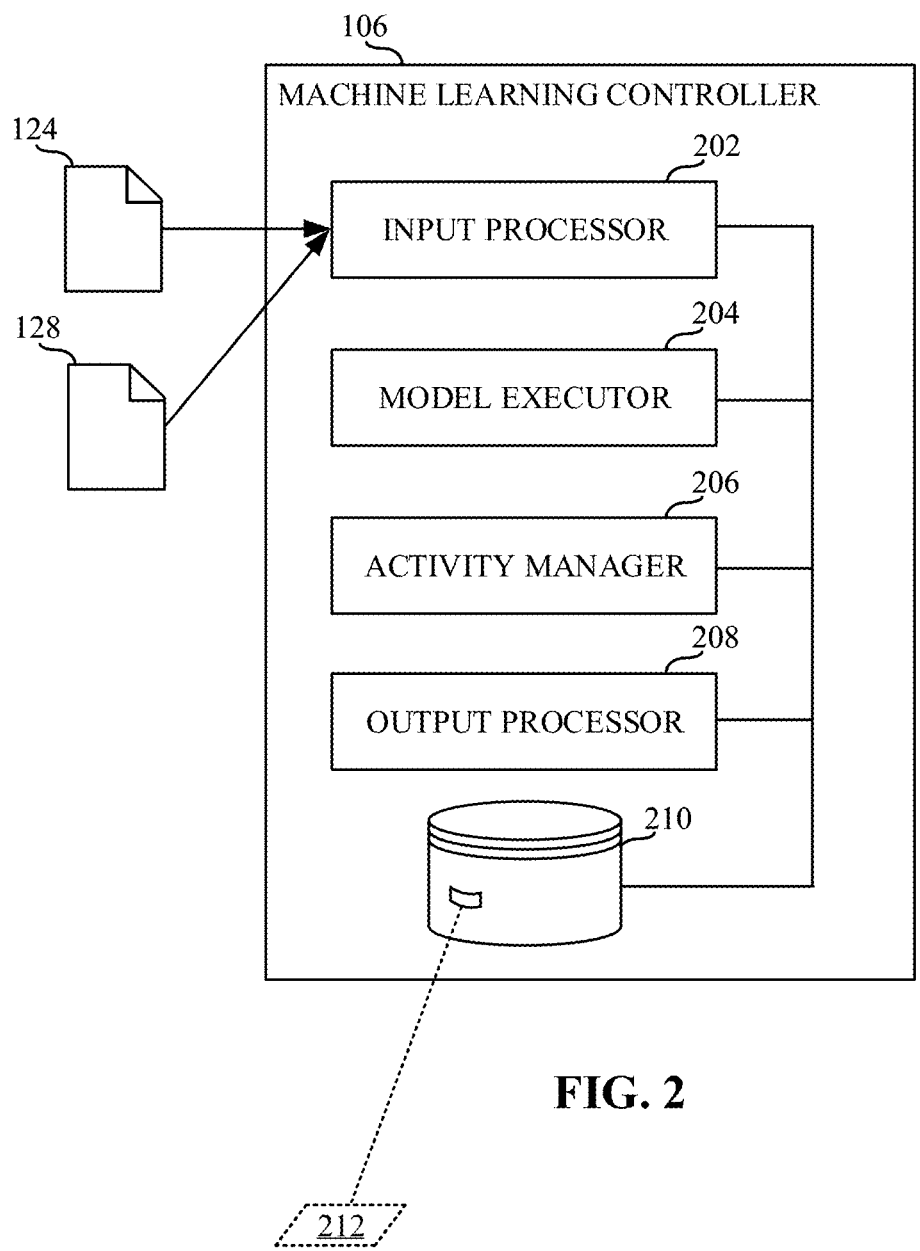
FIG. 2 is an example block diagram illustrating the machine learning controller of FIG. 1.

FIG. 2 is an example block diagram illustrating the machine learning controller 106 of FIG. 1. In FIG. 2, the machine learning controller 106 includes an example input processor 202, an example model executor 204, an example activity manager 206, an example output processor 208, and an example inference data store 210. In the example of FIG. 2, the input processor 202, the model executor 204, the activity manager 206, the output processor 208, and the inference data store 210 are configured to operate in an transductive machine learning environment (e.g., when the environment 100 is a transductive machine learning environment) when a trained GCNN, or GNN, model is not available.

In the example illustrated in FIG. 2, the input processor 202 obtains the example input training data 124 and the example input data 128 of FIG. 1. In examples disclosed herein, the input training data 124 is provided by any suitable entity capable of providing an IP address and/or requesting the verification of IP addresses. In examples disclosed herein, the input processor 202 obtains the input data 128 from the first connectivity environment 108 and/or the second connectivity environment 110. In other examples disclosed herein, the input processor 202 may obtain the input training data 124 and/or the input data 128 from any number of connectivity environments and/or providers (e.g., an ISP). In some examples disclosed herein, the input processor 202 may request the input data 128 from at least one of the first connectivity environment 108 and the second connectivity environment 110.

In examples disclosed herein, the input processor 202 obtains the input training data 124 from either (1) the network 102 of FIG. 1 or (2) from either the first connectivity environment 108 or the second connectivity environment 110 and subsequently label a subset of IP addresses within the input data 128 for use in operation. In some examples disclosed herein, the input processor 202 may obtain the input training data 124 and/or the input data 128 that has been previously analyzed and/or labeled by the machine learning controller 106. For example, a verification request may request the reputation of a first IP address. Once verified, the input processor 202 obtains and stores such a result and such a first IP address for use in generating an example graph database 212. The example input processor 202 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2, the model executor 204 is configured to execute a GNN, or a GCNN, model using the input training data 124 and the input data 128. In the event the graph database 212 has been previously generated, the model executor 204 updates the example graph database 212 to include newly extracted features about the IP addresses in the input training data 124 and/or input data 128.

In operation, the model executor 204 extracts feature data from each IP address in the input training data 124 and the input data 128. For example, model executor 204 identifies characteristics of IP addresses such as, for example, the particular subnetwork of a Class C network, the ASN, the geolocation, etc., associated with the IP address. In this manner, the identified characteristics (e.g., the extracted feature data) are organized as edges in the graph database 212 by the model executor 204.

In response to performing feature extraction, the model executor 204 executes the GNN, or GCNN, model using the graph database 212. In some examples disclosed herein, the model executor 204 stores the graph database 212 in the example inference data store 210. In executing the GNN, or GCNN, the model executor 204 generates and utilizes an example feature matrix (x) and an example adjacency matrix (a) based on the graph database 212. The example model executor 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

Additional description of the model executor 204 is described below, in connection with FIG. 3.

In the example illustrated in FIG. 2, the activity manager 206 determines whether the model executor 204 executed the GNN, or GCNN, model and, thus, whether results are obtained. In the event the activity manager 206 determines that results are obtained, the activity manager 206 parses the results to determine whether an IP address from the input data 128 is disreputable. In the event the activity manager 206 determines an IP address from the input data 128 is disreputable, the activity manager 206 may take anti-malware actions such as, for example, notifying the owner of the IP address, notifying the owner of a neighboring IP address, etc. In examples disclosed herein, the activity manager 206 parses the results from the model executor 204 until analyzing each IP address with an associated result. The example activity manager 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 2, the example output processor 208 is configured to transmit any results from execution of the GNN, or GCNN, to the inference data store 210. In examples disclosed herein, the output processor 208 communicates with first connectivity environment 108 and/or the second connectivity environment 110 to provide the results. The example output processor 208 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2, the inference data store 210 is configured to store the graph database 212, or any updated versions of the graph database 212. In addition, the inference data store 210 stores the input data 128, the results obtained regarding the input data 128, and/or any features extracted from the IP addresses in the input data 128. The example inference data store 210 of the illustrated example of FIG. 2 may be implemented by any device for storing data such as, for example, flash memory, magnetic media, optical media, etc. Furthermore, the data stored in the example inference data store 210 may be in any data format such as, for example, binary data, comma delimited data, tab delimited data, structured query language (SQL) structures, etc.

Figure 3:
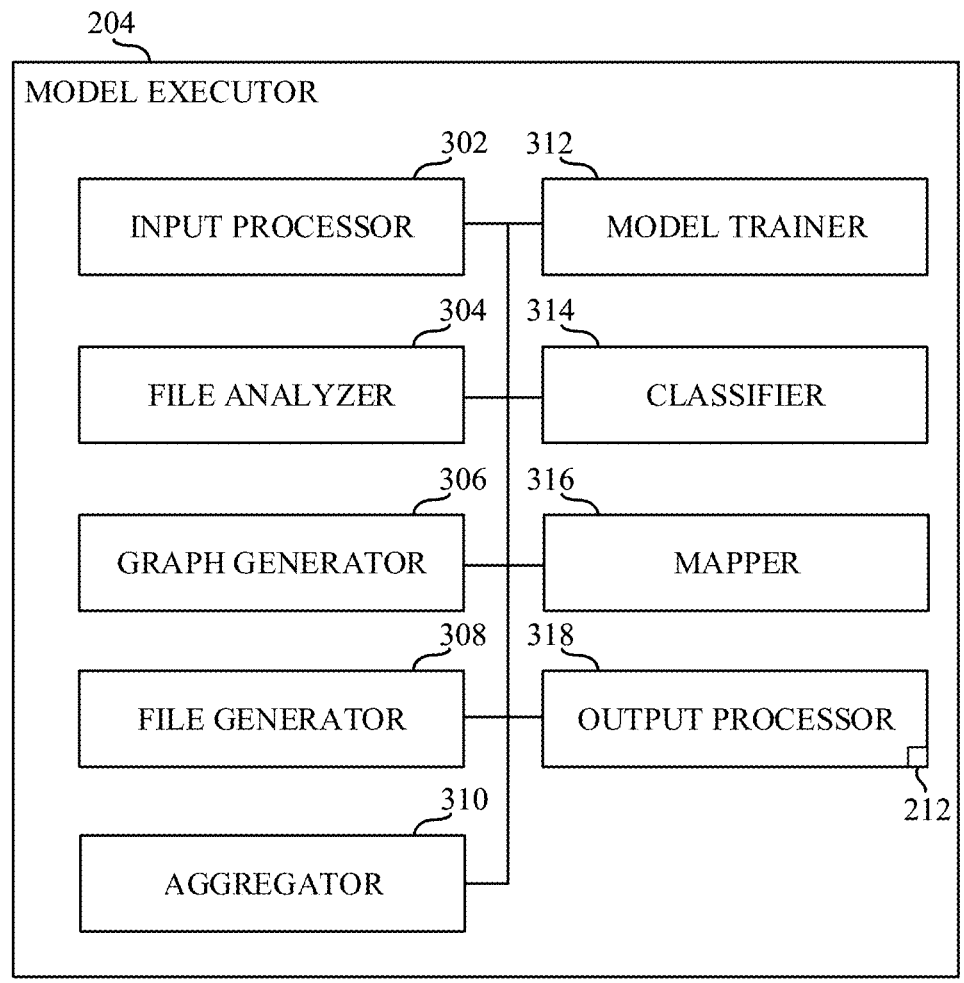
FIG. 3 is a block diagram illustrating the model executor of FIG. 2.

FIG. 3 is a block diagram illustrating the model executor 204 of FIG. 2. In FIG. 3, the model executor 204 includes an example input processor 302, an example file analyzer 304, an example graph generator 306, an example file generator 308, an example aggregator 310, an example model trainer 312, an example classifier 314, an example mapper 316, and an example output processor 318. In the example of FIG. 3, the input processor 302, the file analyzer 304, the graph generator 306, the file generator 308, the aggregator 310, the model trainer 312, the classifier 314, the mapper 316, and the output processor 318 are configured to operate in an transductive machine learning environment (e.g., when the environment 100 is a transductive machine learning environment).

In the example illustrated in FIG. 3, the input processor 302 is configured to obtain example input training data 124 and example input data 128. In operation, the input processor 302 transmits the obtained input training data 124 and the input data 128 to the file analyzer 304. The example input processor 302 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 3, the example file analyzer 304 analyzes each IP address included in the input training data 124 and the input data 128 to identify whether the IP address is known. For example, the file analyzer 304 determines whether the IP address is already included in a previously generated graph database 212. In the event the file analyzer 304 determines an IP address from the input training data 124 and/or the input data 128 is/are not included in a previously generated graph database 212, or the graph database 212 has not yet been generated, the file analyzer 304 communicates such an IP address to the graph generator 306.

In operation, the file analyzer 304 extracts feature data from each IP address in the input training data 124 and the input data 128. For example, the file analyzer 304 is configured to identify characteristics of IP addresses such as, for example, the particular subnetwork of a Class C network, the ASN, the geolocation, etc., associated with the IP address. In this manner, the identified characteristics (e.g., the extracted feature data) are organized as edges in the graph database 421. For example, if two of the four IP addresses known to be reputable (e.g., non-malicious) originate within the same Class C subnetwork, an edge indicating the Class C subnetwork is generated between the two IP addresses sharing the same Class C subnetwork.

Alternatively, in the event the file analyzer 304 determines an IP address is previously included in the graph database 212, the file analyzer 304 determines whether the node and edge data associated with the IP address is accurate. For example, the file analyzer 304 determines whether the edges associated with the IP address have changed (e.g., the IP address is assigned to a new Class C subnetwork, etc.). In the event the file analyzer 304 determines the features (e.g., node and/or edge) corresponding to the IP address have changed, the file analyzer 304 communicates with the graph generator 306 to update the graph database 212. The example file analyzer 304 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 3, the example graph generator 306 is configured to generate, construct, and/or update the graph database 212. For example, the graph generator 306, using the features extracted by the file analyzer 304, organizes the nodes and edges based on the common characteristics. For example, if a first IP address and a second IP address are a part of the same Class C subnetwork, then the graph generator 306 connects a first node (e.g. a first node that represents the first IP address) and the second node (e.g., a second node that represents the second IP address), with a common edge (e.g., the common Class C subnetwork). In examples disclosed herein, the graph generator 306 organizes any suitable number of edges associated with each node. In some examples disclosed herein, the graph generator 306 obtains extracted features associated with an IP address that has been previously included in the graph database 421. In this example, the graph generator 306 updates, if necessary, the nodes and/or edges associated with the known IP address. The example graph generator 306 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example of FIG. 3, the file generator 308 obtains the graph database 212 from the data store 210. Accordingly, the file generator 308 generates an example feature matrix (x) and an example adjacency matrix (a). In examples disclosed herein, the feature matrix (x) generated by the file generator 308 is a matrix of size "N" by "D" in which "N" corresponds the sample size (e.g., the number of IP addresses) and "D" corresponds to the feature dimension. The feature matrix (x) includes input features for each node. In examples disclosed herein, the adjacency matrix (a) generated by the file generator 308 is a matrix of size "N" by "N." The elements in the adjacency matrix include a binary representation of whether an edge exists between two nodes. For example, if an edge corresponding to a particular Class C subnetwork exists between a first node and a second node, such a corresponding element in the adjacency matrix is the binary value "1." The example file generator 308 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 3, the aggregator 310 aggregates the feature matrix (x) and the adjacency matrix (a) as a single input into the model trainer 312. In other examples disclosed herein, the aggregator 310 may aggregate the feature matrix (x) and the adjacency matrix (a) as any suitable number of inputs into the model trainer 312. The example aggregator 310 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 3, the model trainer 312 utilizes and trains a GCNN, or a GNN, using the aggregated feature matrix (x) and adjacency matrix (a). In operation, the model trainer 312 implements a hidden layer in the GCNN, or GNN, to perform layer-wise propagation on the aggregated input matrix. For example, the model trainer 312 may perform a non-linear transformation (e.g., a rectified linear unit (ReLu) transformation) to the aggregated input matrix. The resulting output matrix, an example feature matrix (z), is a matrix of size "N" by "F." The variable "F" corresponds to the feature embedding dimension, is sent to the classifier 314. In examples disclosed herein, the feature matrix (z) is a matrix generated by the model trainer 312 that includes the embeddings of the output features for each node in the graph database 421. The example model trainer 312 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example of FIG. 3, the classifier 314 classifies the feature matrix (z) by performing a classification method. For example, the classifier 314 is operable with the model trainer 312 to perform a supervised form of classification on the feature matrix (z) to learn based on input training data. In examples disclosed herein, any suitable method of classification may be implemented. The example classifier 314 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 3, the example mapper 316 maps the output of the classifier 314 to each node in the graph database 212. For example, the output of the classifier 314 is a probability that a node is reputable or disreputable and, as such, the mapper 316 maps that probability to the corresponding node. The example mapper 316 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 3, the example output processor 318 is configured to transmit the example graph database 212 and the trained GCNN model to the activity manager 206 of FIG. 2. The example output processor 318 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

Figure 4:
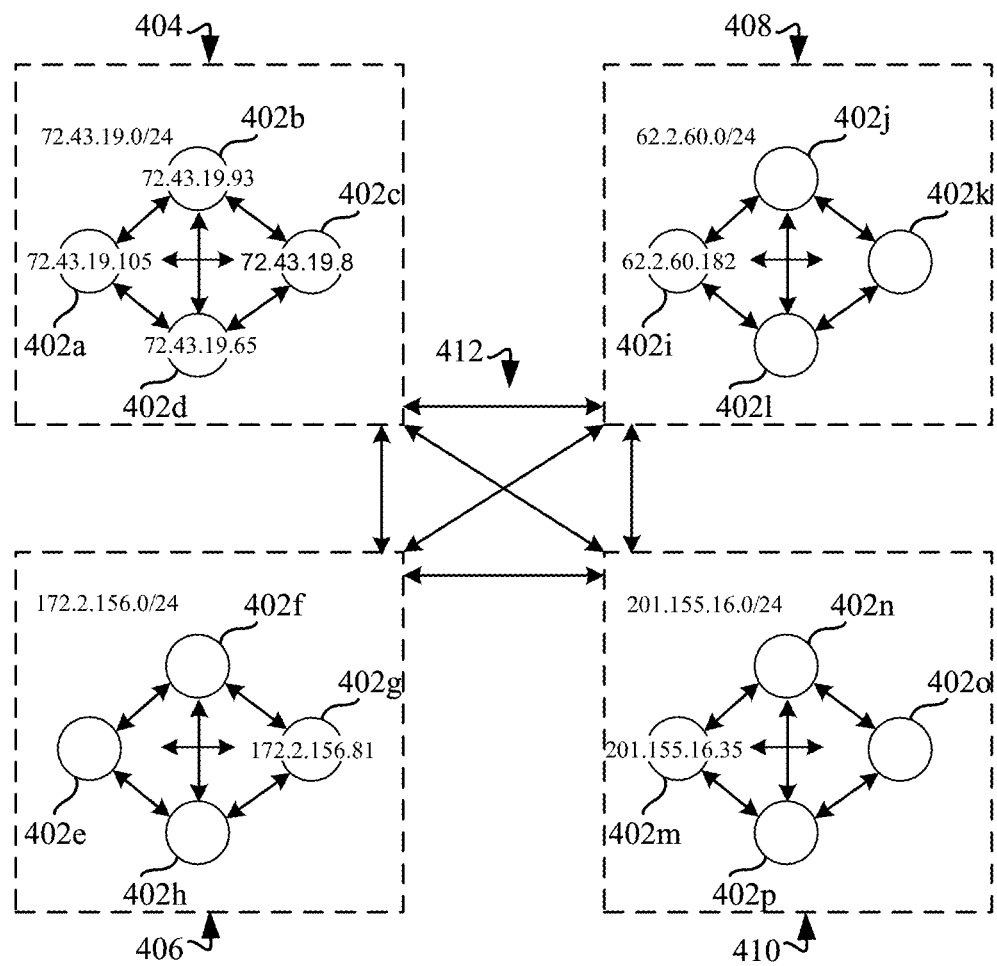
FIG. 4 is an illustration of the graph database of FIGS. 2 and/or 3.

FIG. 4 is an illustration 400 of the graph database 212 of FIGS. 2 and/or 3. For example, the illustration 400 is an example implementation of the graph database 212 of FIGS. 2 and/or 3. In the example of FIG. 4, the graph database includes example nodes 402a-p, an example first group of edges 404, an example second group of edges 406, an example third group of edges 408, an example fourth group of edges 410, an example fifth group of edges 412.

In FIG. 4, the nodes 402a-p each represent a single IP address. While FIG. 4 illustrates nodes 402a-p, any number of nodes may be included in the graph database 212. In the example illustrated in FIG. 4, the first group of edges 404 represents a first common feature among nodes 402a-d. For example, the first common feature corresponds to the Class C subnetwork 72.43.19. Thus, as illustrated in the graph database 212, nodes 402a-d belong to the same Class C subnetwork, 72.43.19.

In the example illustrated in FIG. 4, the second group of edges 406 represents a second common feature among nodes 402e-h. For example, the second common feature corresponds to the Class C subnetwork 172.2.156. Thus, as illustrated in the graph database 212, nodes 402e-h belong to the same Class C subnetwork, 172.2.156.

In the example illustrated in FIG. 4, the third group of edges 408 represents a third common feature among nodes 402i-l. For example, the third common feature corresponds to the Class C subnetwork 62.2.60. Thus, as illustrated in the graph database 212, nodes 402i-l belong to the same Class C subnetwork, 62.2.60.

In the example illustrated in FIG. 4, the fourth group of edges 410 represents a fourth common feature among nodes 402m-p. For example, the fourth common feature corresponds to the Class C subnetwork 201.156.16. Thus, as illustrated in the graph database 212, nodes 402m-p belong to the same Class C subnetwork, 201.156.16.

In the example illustrated in FIG. 4, the fifth group of edges 412 represents a fifth common feature among nodes 402c, 402g, 402i, 402m. For example, the fifth common feature corresponds to a common ASN group. Thus, as illustrated in the graph database 212, nodes 402c, 402g, 402i, 402m belong to the same ASN group.

While an example manner of implementing the machine learning controller 106 of FIG. 1 is illustrated in FIGS. 1, 2, and/or 3, one or more of the elements, processes and/or devices illustrated in FIGS. 1, 2, and/or 3 may be combined, divided, re-arranged, omitted, eliminated and/or implemented in any other way. Further, the example input processor 202, the example model executor 204, the example activity manager 206, the example output processor 208, the example inference data store 210, and/or, more generally, the example machine learning controller 106 of FIGS. 1 and/or 2, and/or the example input processor 302, the example file analyzer 304, the example graph generator 306, the example file generator 308, the example aggregator 310, the example model trainer 312, the example classifier 314, the example mapper 316, the example output processor 318, and/or, more generally, the example model executor 204 of FIGS. 2 and/or 3 may be implemented by hardware, software, firmware and/or any combination of hardware, software and/or firmware. Thus, for example, any of the example input processor 202, the example model executor 204, the example activity manager 206, the example output processor 208, the example inference data store 210, and/or, more generally, the example machine learning controller 106 of FIGS. 1 and/or 2, and/or the example input processor 302, the example file analyzer 304, the example graph generator 306, the example file generator 308, the example aggregator 310, the example model trainer 312, the example classifier 314, the example mapper 316, the example output processor 318, and/or, more generally, the example model executor 204 of FIGS. 2 and/or 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example input processor 202, the example model executor 204, the example activity manager 206, the example output processor 208, the example inference data store 210, the example input processor 302, the example file analyzer 304, the example graph generator 306, the example file generator 308, the example aggregator 310, the example model trainer 312, the example classifier 314, the example mapper 316, the example output processor 318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example machine learning controller 106 of FIGS. 1, 2, and/or 3, and/or the example model executor 204 of FIGS. 2 and/or 3 may include one or more elements, processes and/or devices in addition to, or instead of, those illustrated in FIGS. 1, 2, and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 5:
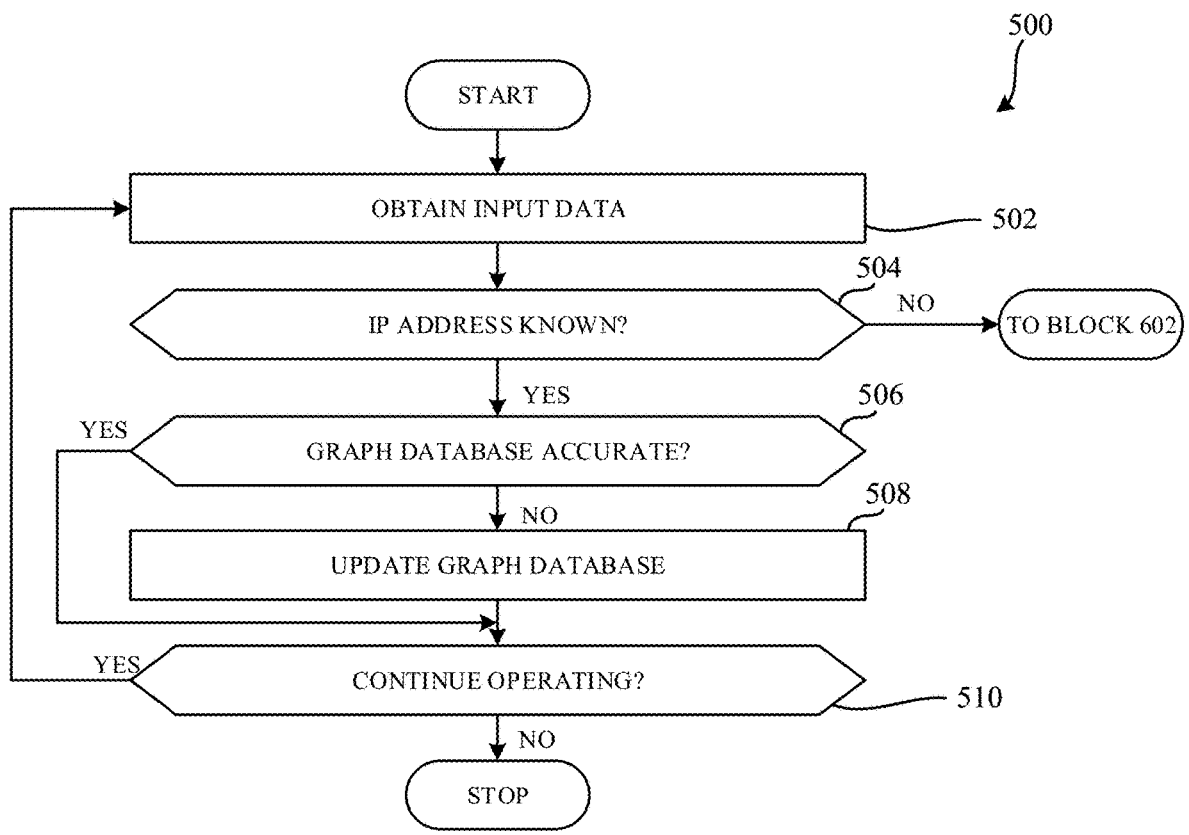
FIG. 5 is a flowchart representative of example machine readable instructions that may be executed by a processor to implement the example machine learning controller of FIGS. 1, 2, and/or 3 to update the example graph database of FIGS. 2 and/or 3.
Figure 6:
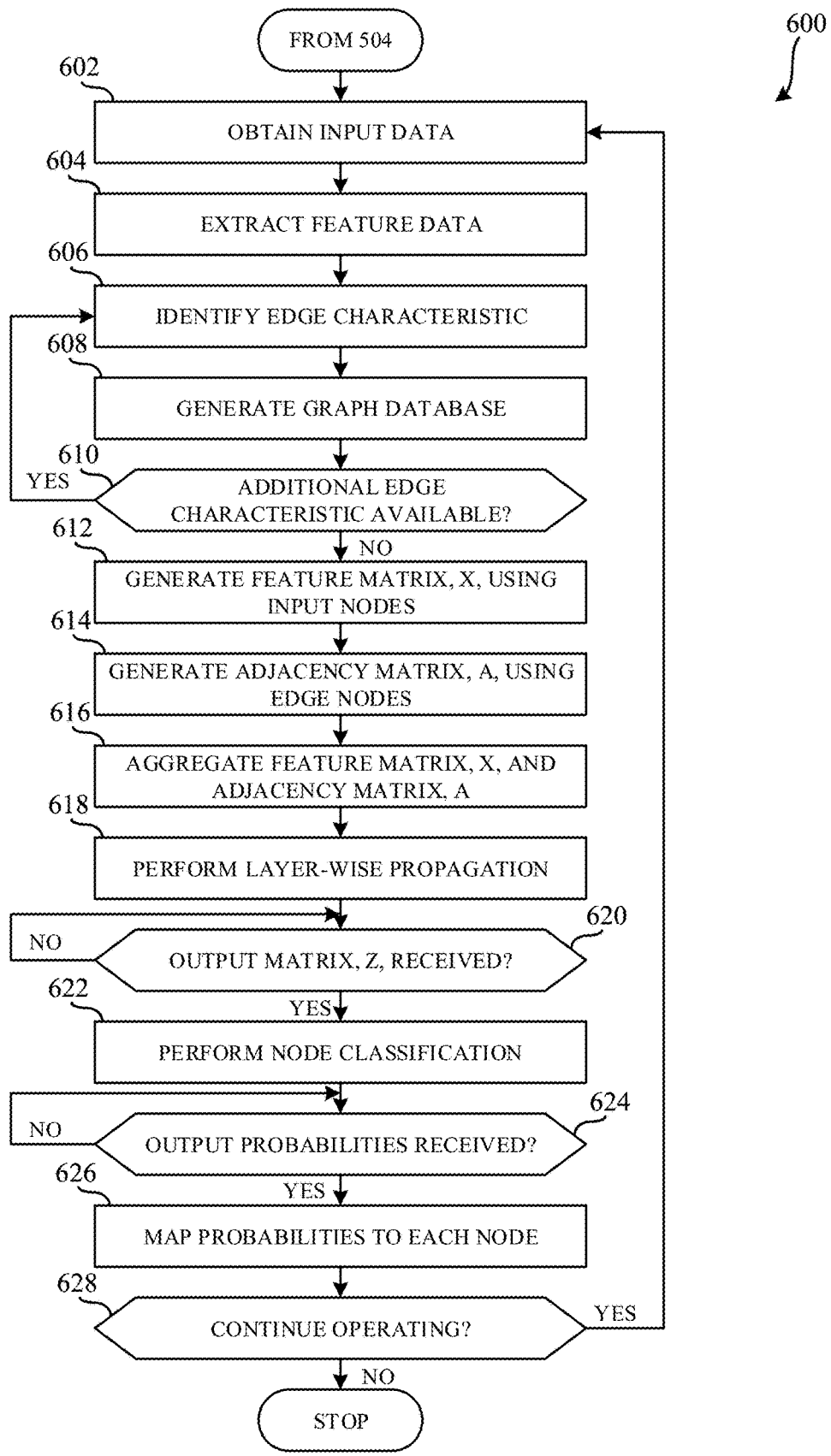
FIG. 6 is a flowchart representative of example machine readable instructions that may be executed by a processor to implement the example machine learning controller of FIGS. 1, 2, and/or 3 execute a GNN model.

Flowcharts representative of example hardware logic, machine readable instructions, hardware implemented state machines, and/or any combination thereof for implementing the machine learning controller 106 and/or the model executor 204 of FIGS. 1, 2, and/or 3 are shown in FIGS. 5, 6, and/or 7. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 5, 6, and/or 7 many other methods of implementing the example machine learning controller 106, and/or the example model executor 204 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 5, 6, and/or 7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions 500 that may be executed by a processor to implement the example machine learning controller 106 of FIGS. 1, 2, and/or 3 to update the example graph database 212 of FIGS. 2 and/or 3.

In the example of FIG. 5, the input processor 302 obtains input data (e.g., the example input training data 124 and/or the example input data 128 of FIG. 1). (Block 502). In examples disclosed herein, the input processor 302 obtains the input data (e.g., the example input training data 124 and/or the input data 128) as a set of labeled IP addresses. In response, the example file analyzer 304 analyzes each IP address included in the input data (e.g., the input training data 124 and/or the input data 128) to identify whether the IP address is known. (Block 504). For example, the file analyzer 304 determines whether the IP address is already included a previously generated graph database. In the event the file analyzer 304 determines an IP address from the input data (e.g., the input training data 124 and/or the input data 128) is not included in a graph database (e.g., the graph database 212 of FIG. 2) (e.g., the control of block 504 returns a result of NO), the process proceeds to block 602 of FIG. 6.

In the event the file analyzer 304 determines an IP address is known (e.g., an IP address is included in the graph database 212) (e.g., the control of block 504 returns a result of YES), the file analyzer 304 determines whether the graph database (e.g., the graph database 212) is accurate. (Block 506). For example, the file analyzer 304 compares the node and edge data associated with the IP address which the node and edge data included in the graph database (e.g., the graph database 212). For example, the file analyzer 304 determines whether the edges associated with the IP address have changed (e.g., the IP address is assigned to a new Class C subnetwork, etc.). In the event the file analyzer 304 determines the graph database is not accurate (e.g., the control of block 506 returns a result of NO), the graph generator 306 updates the graph database (e.g., the graph database 212). (Block 508). In this example, the graph generator 306 updates, if necessary, the nodes and/or edges associated with the known IP address. Alternatively, in the event the file analyzer 304 determines the graph database is accurate (e.g., the control of block 506 returns a result of YES), the process proceeds to block 510.

At block 510, the machine learning controller 106 determines whether to continue operating. (Block 510). For example, the machine learning controller 106 may determine to continue operating in the event additional input training data is obtained. Alternatively, the machine learning controller 106 may determine not to continue operating in the event additional input training data is not available. In the event the machine learning controller 106 determines to continue operating (e.g., the control of block 510 returns a result of YES), the process returns to block 502. Alternatively, in the event the machine learning controller 106 determines not to continue operating (e.g., the control of block 510 returns a result of NO), the process stops.

FIG. 6 is a flowchart representative of example machine readable instructions 600 that may be executed by a processor to implement the example machine learning controller 106 of FIGS. 1, 2, and/or 3 execute a GNN model.

At block 602, the input processor 302 obtains input data (e.g., the input training data 124 and the input data 128 of FIG. 1). (Block 602). In FIG. 6, the example file analyzer 304 of the model executor 204 extracts feature data from each IP address in the input training data 124 and the input data 128. (Block 604). In addition, the file analyzer 304 identifies edge characteristics of the IP addresses. (Block 606).

In FIG. 6, the example graph generator 306 of the model executor 204 is configured to generate a graph database (e.g., the graph database 212 of FIG. 2). (Block 608). For example, the graph generator 306, using the features extracted by the file analyzer 304, organizes the nodes and edges based on the common characteristics. In operation, the file analyzer 304 determines whether additional edge characteristics are available. (Block 610). In the event the file analyzer 304 determines additional edge characteristics are available (e.g., the control of block 610 returns a result of YES), the process returns to block 606. Alternatively, in the event the file analyzer 304 determines additional edge characteristics are not available (e.g., the control of block 610 returns a result of NO), the process proceeds to block 612.

At block 612, the file generator 308 generates an example feature matrix (x). (Block 612). Additionally, the file generator 308 generates an example adjacency matrix (a). (Block 614).

In FIG. 6, the aggregator 310 aggregates the feature matrix (x) and the adjacency matrix (a). (Block 616). At block 618, the model trainer 312 performs layer-wise propagation on the aggregated input matrix. (Block 618). For example, the model trainer 312 performs a non-linear transformation (e.g., ReLu) to the aggregated input matrix.

In response, the classifier 314 determines whether the output matrix (e.g., a feature matrix (z)) is available from the model trainer 312. (Block 620). In the event the classifier 314 determines the output matrix (e.g., the feature matrix (z)) is not available (e.g., the control of block 620 returns a result of NO), the process waits. Alternatively, in the event the classifier 314 determines the output matrix (e.g., the feature matrix (z)) is available (e.g., the control of block 620 returns a result of YES), the classifier 314 performs node classification on the feature matrix (z). (Block 622).

In response, the mapper 316 determines whether the output probability or output probabilities from the classifier 314 is/are received. (Block 624). In the event the mapper 316 determines the output probability or output probabilities is/are not available (e.g., the control of block 624 returns a result of NO), the process waits. Alternatively, in the event the mapper 316 determines the output probability or output probabilities is/are available (e.g., the feature matrix (z)) is available (e.g., the control of block 624 returns a result of YES), the mapper 316 maps the output probability or output probabilities of the classifier 314 to each node in the graph database 421. (Block 626).

At block 628, the machine learning controller 106 determines whether to continue operating. (Block 628). For example, the machine learning controller 106 may determine to continue operating in the event a new graph database is updated and/or obtained, etc. Alternatively, the machine learning controller 106 may determine not to continue operating in the event of a loss of power, no additional input data is available, etc. In the event the machine learning controller 106 determines to continue operating (e.g., the control of block 628 returns a result of YES), the process returns to block 602. Alternatively, in the event the machine learning controller 106 determines not to continue operating (e.g., the control of block 628 returns a result of NO), the process stops.

Figure 7:
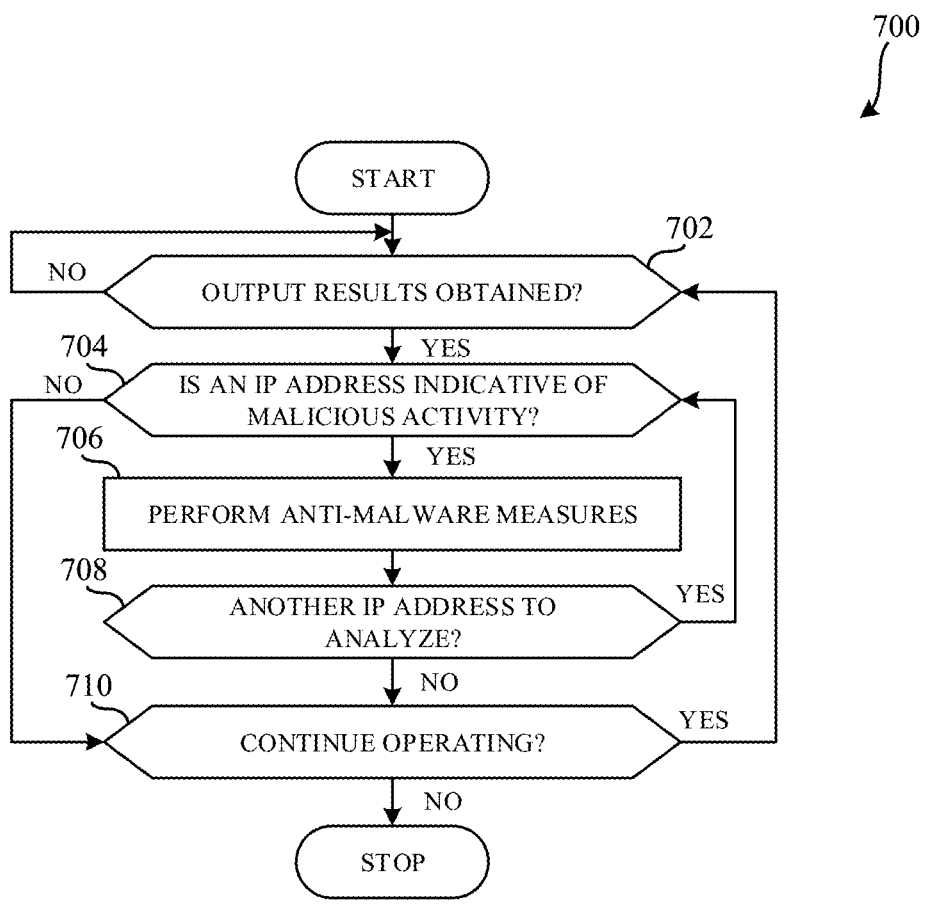
FIG. 7 is a flowchart representative of example machine readable instructions that may be executed by a processor to implement the example machine learning controller of FIGS. 1, 2, and/or 3 initiate anti-malware measures.

FIG. 7 is a flowchart representative of example machine readable instructions 700 that may be executed by a processor to implement the example machine learning controller 106 of FIGS. 1, 2, and/or 3 initiate anti-malware measures.

In FIG. 7, the activity manager 206 determines whether results are obtained. (Block 702). In the event the activity manager 206 determines that results are not obtained (e.g., the control of block 702 returns a result of NO), the process waits.

In the event the activity manager 206 determines that results are obtained (e.g., the control of block 702 returns a result of YES), the activity manager 206 parses the results to determine whether an IP address from the input data 128 is indicative of malicious activity (e.g., disreputable). (Block 704).

In the event the activity manager 206 determines an IP address from the input data 128 is indicative of malicious activity (e.g., the control of block 704 returns a result of YES), the activity manager 206 performs anti-malware actions. (Block 706). For example, the activity manager 206 may notify the owner of the IP address. In response, the activity manager 206 determines whether there is another IP address to analyze. (Block 708). In the event the activity manager 206 determines there is another IP address to analyze (e.g., the control of block 708 returns a result of YES), the process returns to block 704.

Alternatively, in the event the activity manager 206 determines there is not another IP address to analyze (e.g., the control of block 708 returns a result of NO), or in the event the activity manager 206 determines that an IP address from the input data 128 is not indicative of malicious activity (e.g., reputable) (e.g., the control of block 704 returns a result of NO), the activity manager 206 determines whether to continue operating. (Block 710).

At block 710, the machine learning controller 106 determines whether to continue operating. (Block 710). For example, the machine learning controller 106 may determine to continue operating in the event a new graph database is updated and/or obtained, additional input data is available, etc. Alternatively, the machine learning controller 106 may determine not to continue operating in the event of a loss of power, no additional input data available, etc. In the event the machine learning controller 106 determines to continue operating (e.g., the control of block 710 returns a result of YES), the process returns to block 702. Alternatively, in the event the machine learning controller 106 determines not to continue operating (e.g., the control of block 710 returns a result of NO), the process stops.

Figure 8:
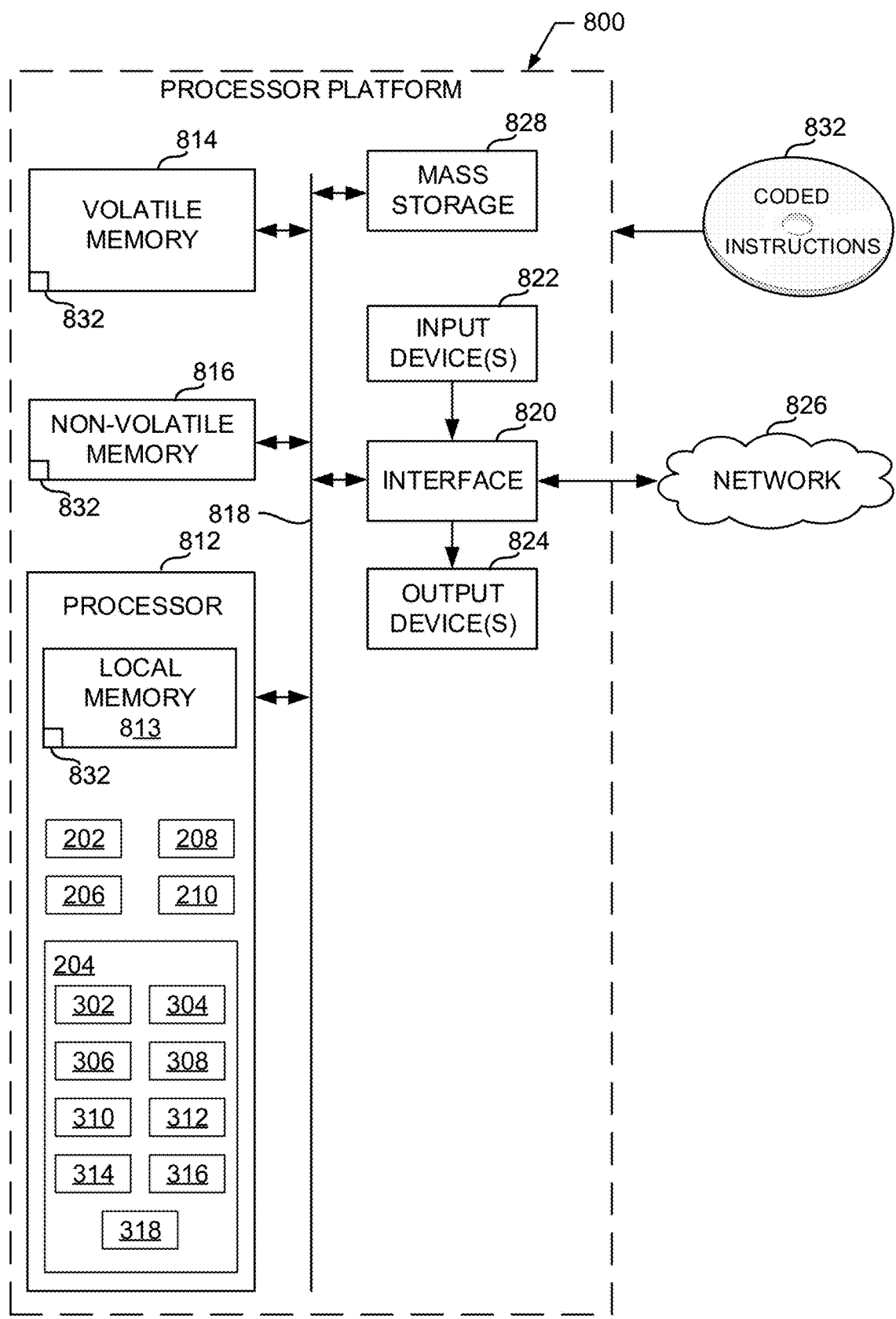
FIG. 8 is a block diagram of an example processor platform structured to execute the instructions of FIGS. 5, 6, and/or 7 to implement the machine learning controller of FIGS. 1, 2, and/or 3, and/or the model executor of FIGS. 2 and/or 3.

FIG. 8 is a block diagram of an example processor platform 800 structured to execute the instructions of FIGS. 5, 6, and/or 7 to implement the machine learning controller 106 of FIGS. 1, 2, and/or 3, and/or the model executor 204 of FIGS. 2 and/or 3. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor implements the example input processor 202, the example model executor 204, the example activity manager 206, the example output processor 208, the example inference data store 210, the example input processor 302, the example file analyzer 304, the example graph generator 306, the example file generator 308, the example aggregator 310, the example model trainer 312, the example classifier 314, the example mapper 316, and/or the example output processor 318.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 5, 6, and/or 7 may be stored in the mass storage device 828, in the volatile memory 814, in the non-volatile memory 816, and/or on a removable non-transitory computer readable storage medium such as a CD or DVD.

From the foregoing, it will be appreciated that example methods, apparatus and articles of manufacture have been disclosed that efficiently analyze network traffic for malicious activity. The disclosed methods, apparatus and articles of manufacture improve the efficiency of using a computing device by generating a graph data structure based on one or more IP addresses. Furthermore, the disclosed methods, apparatus and articles of manufacture improve the efficiency of using a computing device by utilizing the generated graph to detect whether an IP address is associated with malicious activity. As such, by determining the reputation of an IP address, examples disclosed herein prevent a user from initiating a malicious attack from an IP address determined to be disreputable. For example, in determining the reputation of an IP address, examples disclosed herein can reduce the number of malicious attacks carried out because anti-malware measures may be taken once a disreputable IP address is identified. In addition, examples disclosed herein may prevent future installation of malicious software in the event an associated IP address is determined to be disreputable.

Accordingly, the disclosed methods, apparatus and articles of manufacture enable a computing device to identify the reputation of an IP address and, as such, perform action in the event the reputation is determined to be disreputable. For example, the disclosed methods, apparatus and articles of manufacture perform anti-malware measures such as, for example, notifying the owner and/or neighbors of the IP address that such an address is disreputable. The graph database and/or other graph data structure enable examples disclosed herein to facilitate verification of an IP address reputation in a computationally efficient manner. The disclosed methods, apparatus and articles of manufacture are accordingly directed to one or more improvement(s) in the functioning of a computer.

Example methods, apparatus, systems, and articles of manufacture to analyze network traffic for malicious activity are disclosed herein. Further examples and combinations thereof include the following:

Example 1 includes an apparatus comprising a graph generator to, in response to obtaining one or more internet protocol addresses included within input data, generate a graph data structure based on one or more features of the one or more internet protocol addresses in the input data, a file generator to generate a first matrix using the graph data structure, the first matrix to represent nodes in the graph data structure, and generate a second matrix using the graph data structure, the second matrix to represent edges in the graph data structure, and a classifier to, using the first matrix and the second matrix, classify at least one of the one or more internet protocol addresses to identify a reputation of the at least one of the one or more internet protocol addresses.

Example 2 includes the apparatus of example 1, wherein the apparatus is implemented in a transductive machine learning environment.

Example 3 includes the apparatus of example 2, further including an input processor to obtain the input data from at least one of a training controller and a connectivity environment.

Example 4 includes the apparatus of example 3, wherein the input processor is to obtain the input data in response to a reputation verification request, the reputation verification request requesting to identify the reputation of at least one of the one or more internet protocol addresses.

Example 5 includes the apparatus of example 2, further including a file analyzer to extract the one or more features from the one or more internet protocol addresses in the input data.

Example 6 includes the apparatus of example 5, wherein, to extract the one or more features, the file analyzer is to identify at least one of a subnetwork or an autonomous system numbers group associated with the one or more internet protocol addresses.

Example 7 includes the apparatus of example 1, wherein the classifier is operable with a graph neural network.

Example 8 includes a non-transitory computer readable storage medium comprising instructions which, when executed, cause at least one processor to at least generate, in response to obtaining one or more internet protocol addresses included within input data, a graph data structure based on one or more features of the one or more internet protocol addresses in the input data, generate a first matrix using the graph data structure, the first matrix to represent nodes in the graph data structure, generate a second matrix using the graph data structure, the second matrix to represent edges in the graph data structure, and classify, using the first matrix and the second matrix, at least one of the one or more internet protocol addresses to identify a reputation of the at least one of the one or more internet protocol addresses.

Example 9 includes the computer readable storage medium of example 8, wherein the at least one processor is implemented in a transductive machine learning environment.

Example 10 includes the computer readable storage medium of example 9, wherein the instructions, when executed, cause the at least one processor to obtain the input data from at least one of a training controller and a connectivity environment.

Example 11 includes the computer readable storage medium of example 10, wherein the instructions, when executed, cause the at least one processor to obtain the input data in response to a reputation verification request, the reputation verification request requesting to identify the reputation of at least one of the one or more internet protocol addresses.

Example 12 includes the computer readable storage medium of example 9, wherein the instructions, when executed, cause the at least one processor to extract the one or more features from the one or more internet protocol addresses in the input data.

Example 13 includes the computer readable storage medium of example 12, wherein the instructions, when executed, cause the at least one processor to extract the one or more features by identifying at least one of a subnetwork or an autonomous system numbers group associated with the one or more internet protocol addresses.

Example 14 includes the computer readable storage medium of example 8, wherein the at least one processor is operable with a graph neural network.

Example 15 includes a method comprising generating, in response to obtaining one or more internet protocol addresses included within input data, a graph data structure based on one or more features of the one or more internet protocol addresses in the input data, generating a first matrix using the graph data structure, the first matrix to represent nodes in the graph data structure, generating a second matrix using the graph data structure, the second matrix to represent edges in the graph data structure, and classifying, using the first matrix and the second matrix, at least one of the one or more internet protocol addresses to identify a reputation of the at least one of the one or more internet protocol addresses.

Example 16 includes the method of example 15, wherein classifying the at least one of the one or more internet protocol addresses is implemented in a transductive machine learning environment.

Example 17 includes the method of example 16, further including obtaining the input data in response to a reputation verification request, the reputation verification request requesting to identify the reputation of at least one of the one or more internet protocol addresses.

Example 18 includes the method of example 16, further including extracting the one or more features from the one or more internet protocol addresses in the input data.

Example 19 includes the method of example 18, further including extracting the one or more features by identifying at least one of a subnetwork or an autonomous system numbers group associated with the one or more internet protocol addresses.

Example 20 includes the method of example 15, wherein classifying the at least one of the one or more internet protocol addresses is implemented with a graph neural network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a graph generator to, in response to obtaining internet protocol addresses included within input data, generate a graph data structure based on one or more features of the internet protocol addresses in the input data;
   a file generator to:
      generate a first matrix using the graph data structure, the first matrix to represent nodes in the graph data structure, the nodes each corresponding to a respective internet protocol address of the internet protocol addresses; and
      generate a second matrix using the graph data structure, the second matrix to represent edges in the graph data structure, the edges each corresponding to a relationship between the nodes based on a subnetwork that includes the internet protocol addresses associated with the nodes; and
   a classifier to, using the first matrix and the second matrix, classify the nodes to identify a reputation of the internet protocol addresses.

2. The apparatus of claim 1, wherein the apparatus is implemented in a transductive machine learning environment.

3. The apparatus of claim 2, further including an input processor to obtain the input data from at least one of a training controller or a connectivity environment.

4. The apparatus of claim 3, wherein the input processor is to obtain the input data in response to a reputation verification request, the reputation verification request requesting to identify the reputation of at least one of the internet protocol addresses.

5. The apparatus of claim 2, further including a file analyzer to extract the one or more features from the internet protocol addresses in the input data.

6. The apparatus of claim 5, wherein, to extract the one or more features, the file analyzer is to identify at least one of the subnetwork or an autonomous system numbers group associated with the internet protocol addresses.

7. The apparatus of claim 1, wherein the classifier is operable with a graph neural network.

8. A non-transitory computer readable storage medium comprising instructions which, when executed, cause at least one processor to at least:
generate, in response to obtaining internet protocol addresses included within input data, a graph data structure based on one or more features of the internet protocol addresses in the input data;
generate a first matrix using the graph data structure, the first matrix to represent nodes in the graph data structure, the nodes each corresponding to a respective internet protocol address of the internet protocol addresses;
generate a second matrix using the graph data structure, the second matrix to represent edges in the graph data structure, the edges each corresponding to a relationship between the nodes based on a geographic location of the internet protocol addresses associated with the nodes; and
classify, using the first matrix and the second matrix, the nodes to identify a reputation of the internet protocol addresses.

9. The computer readable storage medium of claim 8, wherein the at least one processor is implemented in a transductive machine learning environment.

10. The computer readable storage medium of claim 9, wherein the instructions, when executed, cause the at least one processor to obtain the input data from at least one of a training controller or a connectivity environment.

11. The computer readable storage medium of claim 10, wherein the instructions, when executed, cause the at least one processor to obtain the input data in response to a reputation verification request, the reputation verification request requesting to identify the reputation of at least one of the internet protocol addresses.

12. The computer readable storage medium of claim 9, wherein the instructions, when executed, cause the at least one processor to extract the one or more features from the internet protocol addresses in the input data.

13. The computer readable storage medium of claim 12, wherein the instructions, when executed, cause the at least one processor to extract the one or more features by identifying at least one of a subnetwork or an autonomous system numbers group associated with the internet protocol addresses.

14. The computer readable storage medium of claim 8, wherein the at least one processor is operable with a graph neural network.

15. A method comprising:
generating, in response to obtaining internet protocol addresses included within input data, a graph data structure based on one or more features of the internet protocol addresses in the input data;
generating a first matrix using the graph data structure, the first matrix to represent nodes in the graph data structure, the nodes each corresponding to a respective internet protocol address of the internet protocol addresses;
generating a second matrix using the graph data structure, the second matrix to represent edges in the graph data structure, the edges indicative of respective ones of the nodes that share a same autonomous system number; and
classifying, using the first matrix and the second matrix, the nodes to identify a reputation of the internet protocol addresses.

16. The method of claim 15, wherein classifying the at least one of the internet protocol addresses is implemented in a transductive machine learning environment.

17. The method of claim 16, further including obtaining the input data in response to a reputation verification request, the reputation verification request requesting to identify the reputation of at least one of the internet protocol addresses.

18. The method of claim 16, further including extracting the one or more features from the internet protocol addresses in the input data.

19. The method of claim 18, further including extracting the one or more features by identifying at least one of a subnetwork or the same autonomous system number associated with the internet protocol addresses.

20. The method of claim 15, wherein classifying the at least one of the internet protocol addresses is implemented with a graph neural network.

21. The apparatus of claim 1, wherein the relationship between the nodes represented by the edges is based on a geographic location of the internet protocol addresses associated with the nodes.

22. The computer readable storage medium of claim 8, wherein the relationship between the nodes represented by the edges is based on shared autonomous system numbers indicated by the internet protocol addresses associated with the nodes.

23. The method of claim 15, wherein the edges are indicative of respective ones of the nodes that are in a same subnetwork.

* * * * *